J. J. MAYROW.
CONSTRUCTION OF AIRCRAFT WINGS AND AEROFOILS.
APPLICATION FILED DEC. 5, 1917.
1,421,280.
Patented June 27, 1922.
3 SHEETS—SHEET 1.
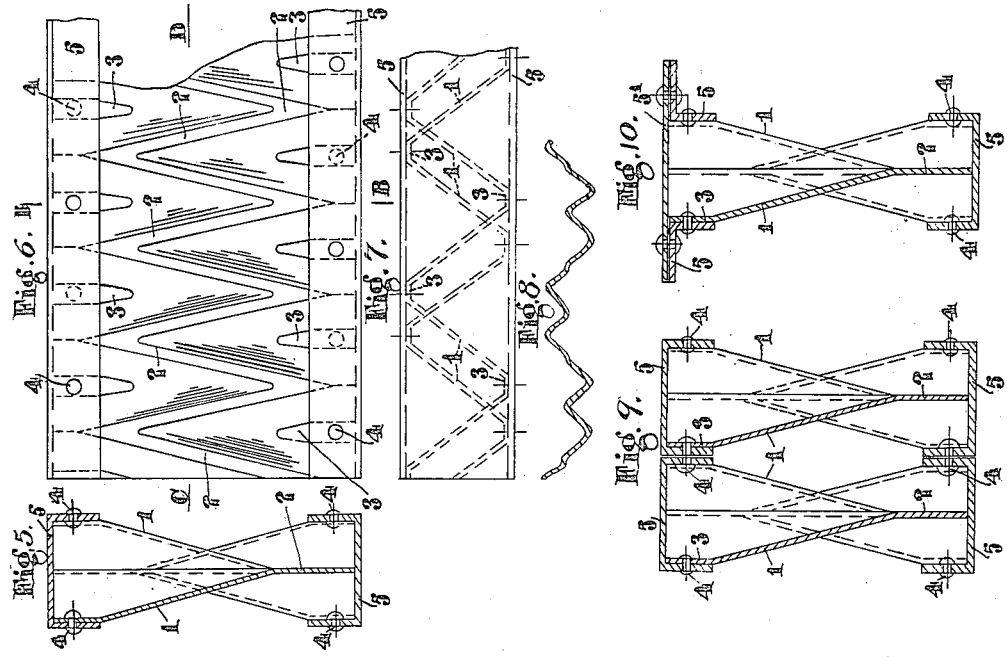
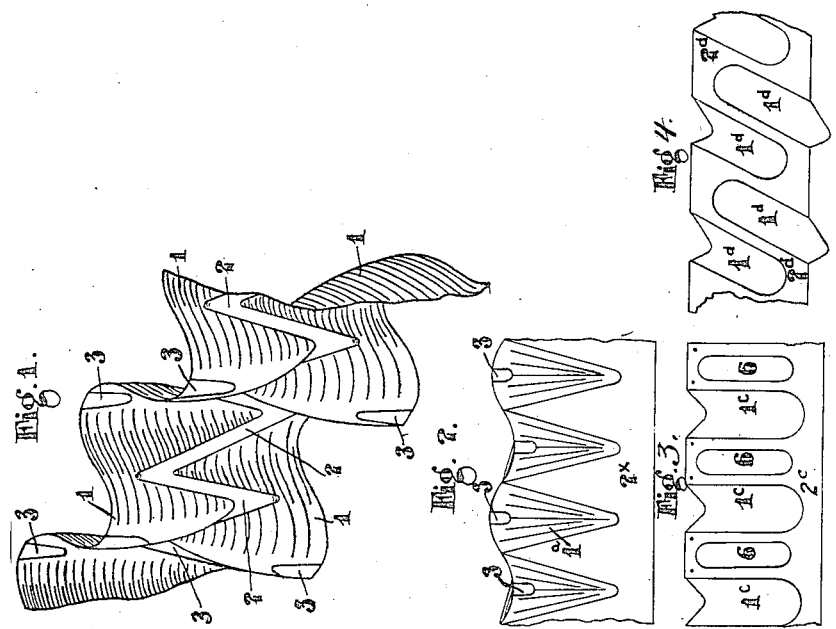

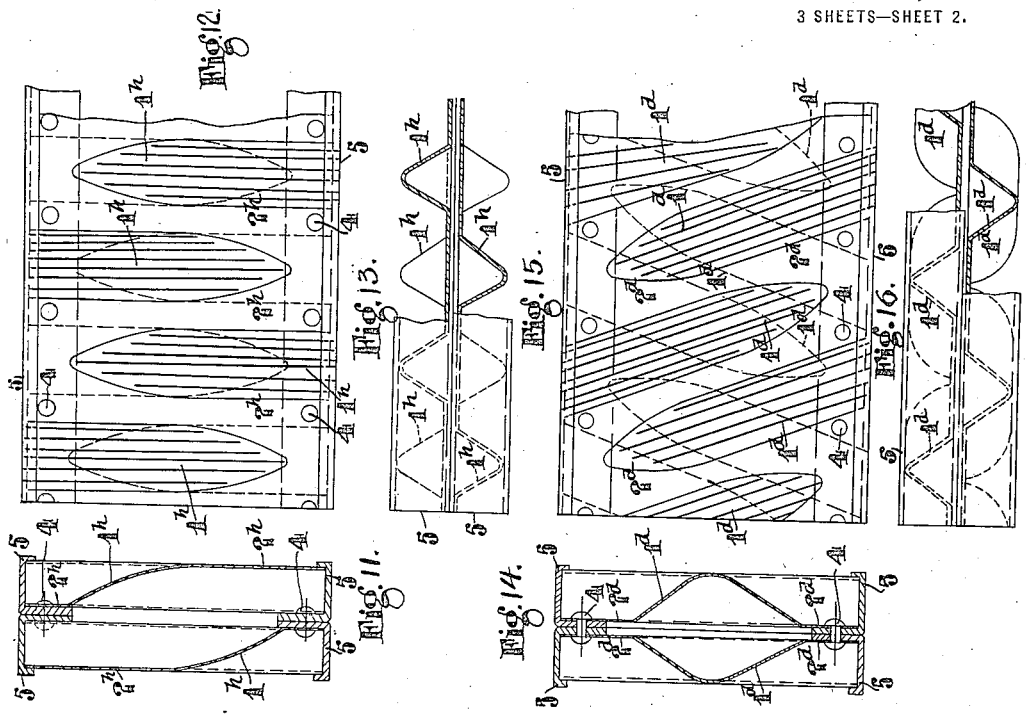

J. J. MAYROW.
CONSTRUCTION OF AIRCRAFT WINGS AND AEROFOILS.
APPLICATION FILED DEC. 5, 1917.
1,421,280.
Patented June 27, 1922.
3 SHEETS—SHEET 3.
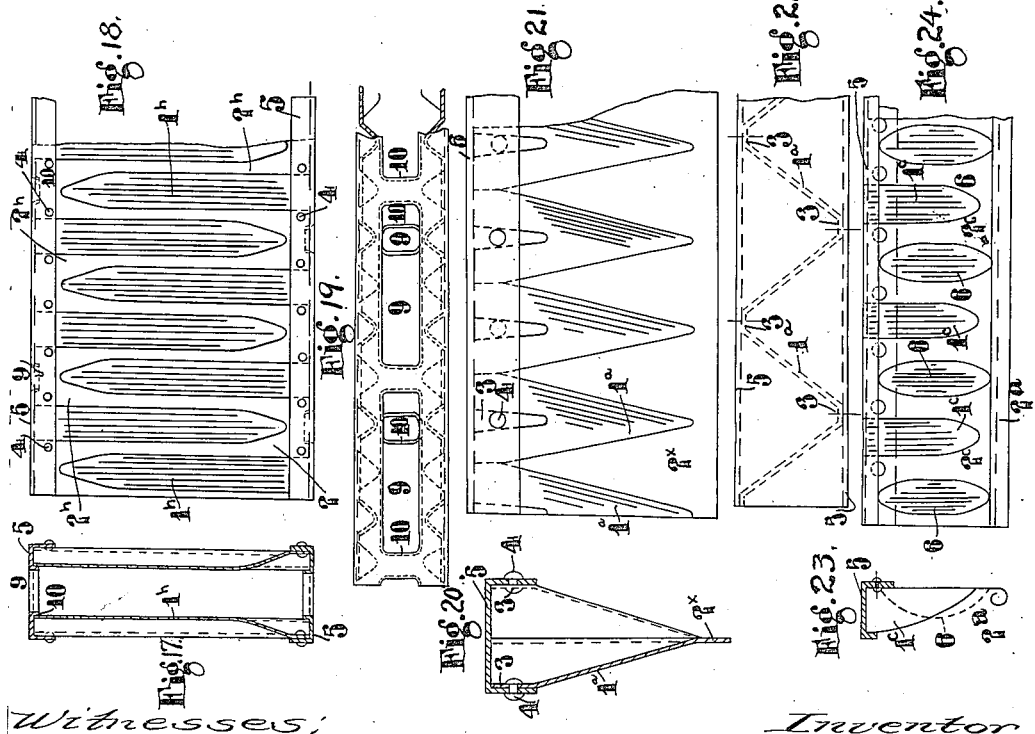

UNITED STATES PATENT OFFICE.

JAMES JACOB MAYROW, OF LONDON, ENGLAND.

CONSTRUCTION OF AIRCRAFT WINGS AND AEROFOILS.

1,421,280.  Specification of Letters Patent. Patented June 27, 1922.

Application filed December 5, 1917. Serial No. 205,643.

*To all whom it may concern:*

Be it known that JAMES JACOB MAYROW, a citizen of Russia, residing at London, England, has invented certain new and useful Improvements in or Connected with the Construction of Aircraft Wings and Aerofoils, of which the following is a specification.

The object of my invention is to construct improved wing flaps, aeroplane frames and aerofoils entirely of metal so as to secure great strength with small weight.

For this purpose I employ a spar, tapered or not, the cross section of which is preferably deeper than its width, and the sides of which are made up of one, two or more corrugated lengths, the corrugations of which do not extend across the length but are arranged either alternately or are positioned at one edge only with flat portions between. The top and bottom members are each formed of one, two or more U section lengths of which, in the case of two or more, one flange may be deeper than the other, the corrugated sides fitting into the grooves thus formed and being fastened therein by riveting, welding, clenching, or other suitable means to themselves and to the U members, or in some cases, to the U members only.

The corrugations may be of various shapes, in the form of bossings or flutings and may be variously disposed, and such bossings or flutings may have straight or angled ends which can be riveted, welded, or clenched in a suitable manner to the top and bottom members.

The ribs consist of top and bottom U or the like sections with distance pieces formed of corrugated or fluted stampings which may have flanges top and bottom to which the U or the like sections are fastened by riveting, clenching or other suitable means. These ribs are attached to the spars by stamping forming brackets fitting the corrugations and into the ribs and riveted, clenched or otherwise fastened.

Where attachments are made to the spar, such as for the controlling lever, or for the ribs, the slots for the hinges, internal or external wiring, and the like, I employ stampings shaped to rest in the corrugations to strengthen the parts.

The trailing edge is formed of U-section metal secured to the tops of the ribs, and intermediate stringers are used to stiffen the whole structure.

If necessary the side corrugations of the spars can be lightened by cutting round, elliptical, or other shaped holes through them.

My invention will be clearly understood from the following description aided by the several examples shown on the annexed drawings in which—

Figure 1 is a perspective view of a portion of a corrugated length or element having its corrugations arranged alternately and not extending completely across the same, the intermediate portions being flat.

Figure 2 is an elevation of a portion of a modified construction of length or element having cone shaped corrugations partially across the same and provided with flat portions.

Figure 3 is an elevation of a portion of an element having corrugations partially thereacross and bosses between the corrugations.

Figure 4 is a perspective view of a portion of a length or element having corrugations extending partly thereacross on alternate sides and edges.

Figure 5 is a section on the line B B (Figure 6), Figure 6 an elevation, Figure 7 a plan, and Figure 8 a section on the line C D of Figure 6, showing a portion of a spar made up from U members and lengths of the form shown in Figure 1.

Figure 9 is a transverse section of two spars of the construction shown in Figures 5 and 6 riveted together to form a single spar.

Figure 10 is a view similar to Figure 5 but showing one U member composed of a flat length of metal and two angle irons.

Figure 11 is a transverse section, Figure 12 an elevation, and Fig. 13 a plan, partly in section, of a spar or girder comprising four U members and two lengths of a form similar to that shown in Figure 4, the corrugations being disposed at a right angle to the length.

Figure 14 is a transverse section, Figure 15 an elevation, and Figure 16 a plan, partly in section, of a construction similar to that shown in Figures 11, 12 and 13, except that the corrugations of the several lengths are arranged at an inclination to each other.

Figure 17 is a transverse section, Figure 18 an elevation, and Figure 19 a plan of part of a spar similar to that shown in Figure 12 but in which the lengths are spaced apart by flanged perforations in the U members.

Figure 20 is a transverse section, Figure 21 an elevation, and Figure 22 a plan of part of a strut, stretcher or runner made up of a U member and a length constructed as shown in Figure 2.

Figure 23 is a transverse section and Figure 24 an elevation of a strut, stretcher or runner constructed from a U member and a length of the character shown in Figure 3, the free edges being rolled over.

In the length or element shown in Figure 1, the corrugations 1 are somewhat U shaped and are arranged alternately from opposite edges and do not extend completely across the element, the corrugations 1 being provided with flat portions 3 at which portions the length is connected to the U section lengths, while the portions of the corrugated length are left flat or only slightly curved, as at 2, between the corrugations. A spar composed of elements of this form is shown in Figures 5, 6, 7 and 8. In the latter figures only one corrugated element is employed, this being secured as by rivets 4, to two U-shaped section lengths 5, 5.

As shown in Figure 9, two spars similar to those shown in Figures 5 and 6 are riveted together to form a single spar.

Figure 10 shows a construction in which one of the U-shaped section lengths is composed of two L irons 5, 5 connected to a flat length $5^1$ of metal.

The element illustrated in Figure 2 is shown fitted up as a strut, stretcher, or runner in Figures 20, 21 and 22. In this case the corrugations $1^a$ at their flat portions $2^x$ are connected to a U-shaped length, the flat edge being unconnected.

In Figure 3 is illustrated a length or element in which the corrugations $1^c$ are formed on one side only, bosses 6 being formed between the corrugations $1^c$ and projecting on the same side as the corrugations. An element of this form is shown as forming a part of a strut, stretcher or runner in Figures 23 and 24. In Figure 3 I have shown the non-corrugated edge of the length or element as plain, but in Figures 23 and 24 I have shown the non-corrugated edge as rolled over as at $2^a$.

The construction shown in Figure 4 is also shown in Figures 14 and 15 as made up as a spar. In this construction two corrugated lengths are employed, each being connected to a U-section 5 with their corrugations oppositely disposed, each pair of sections 5 being riveted together.

Figures 11, 12 and 13 show a construction similar to that shown in Figures 4, 14 and 15, except that the corrugations $1^h$ are disposed at a right angle. Figures 17, 18 and 19 show a spar constructed similar to that shown in Figure 12 but with the flat portion of the corrugated lengths riveted to the external flanges of the U length which is perforated at 9 and flanged at 10 for stiffening purposes.

What I do claim as my invention, and desire to secure by Letters Patent, is:—

1. A structural member for aeronautical machines comprising a corrugated element with the corrugations extending from two opposite edges thereof partially across such element, leaving an uncorrugated portion between an end of each corrugation and the adjacent edge of the element, and a separate substantially U-shaped element at each edge of the corrugated element, said U-shaped elements being disposed with their concave sides towards said corrugated element and being directly and rigidly secured thereto.

2. A structural member for aeronautical machines comprising a corrugated element with the corrugations extending from one edge thereof partly across said element and towards said opposite edge, leaving a plane portion between an end of each corrugation and the said opposite edge of the element, and a separate substantially U-shaped element at an edge of the corrugated element, said U-shaped element being disposed with its concave side towards said corrugated element and being directly and rigidly secured thereto.

3. A structural member for aeronautical machines comprising a pair of corrugated elements disposed side by side with the corrugations of each element extending from an edge thereof partially across such element, and a separate channel-shaped member embracing the adjacent edges of said corrugated elements, the flanges of said member being directly and rigidly secured to the corrugations of said element.

4. A structural member for aeronautical machines comprising a pair of corrugated elements disposed in engagement with one another, the corrugations of each element extending alternately to the edges thereof, providing alternately corrugated and uncorrugated portions along each edge, and a separate corrugated element embracing the adjacent edges of said corrugated elements and directly and rigidly secured thereto.

5. A structural member for aeronautical machines comprising a pair of corrugated elements, certain of the corrugations of each element terminating within one of its edges and others terminating within its other edge thereof, and a channel-shaped element embracing the adjacent edges of said corrugated elements and having its flanges secured directly and rigidly to the corrugated pairs of said elements.

6. A structural member for aeronautical machines comprising a pair of corrugated elements disposed side by side, certain corrugations of each element terminating short of one of its edges while other corrugations of each element terminate short of its other edge, and a pair of separate substantially U-shaped elements at the opposite edges of said corrugated elements, said U-shaped elements being disposed with their concave sides toward said corrugated elements and having their flanges rigidly and directly secured to the adjacent corrugations thereof.

7. A structural member for aeronautical machines comprising a pair of corrugated elements disposed side by side, each element having corrugations which extend to one edge thereof and terminate within the opposite edge of such element, and a pair of channel-shaped elements at the opposite edges of said corrugated elements, said channel-shaped elements having their flanges turned inwardly and secured to said elements.

In testimony whereof I have hereunto set my hand in presence of two subscribing witnesses.

JAMES JACOB MAYROW.

Witnesses:
RICHARD CORE GARDNER,
CHARLES ALFRED GROSSETETE.